United States Patent
Weidner

(10) Patent No.: US 11,016,523 B2
(45) Date of Patent: May 25, 2021

(54) CONTROL OF REDUNDANT PROCESSING UNITS

(71) Applicant: WAGO Verwaltungsgesellschaft mbH, Minden (DE)

(72) Inventor: Markus Weidner, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 70 days.

(21) Appl. No.: 16/429,479

(22) Filed: Jun. 3, 2019

(65) Prior Publication Data

US 2019/0286187 A1 Sep. 19, 2019

Related U.S. Application Data

(63) Continuation of application No. PCT/IB2017/001267, filed on Oct. 19, 2017.

(30) Foreign Application Priority Data

Dec. 3, 2016 (DE) .................. 20 2016 007 417.3

(51) Int. Cl.
*G06F 1/12* (2006.01)
*G06F 13/42* (2006.01)
(Continued)

(52) U.S. Cl.
CPC ........... *G06F 1/08* (2013.01); *G05B 19/0428* (2013.01); *G05B 19/058* (2013.01); *G06F 1/12* (2013.01);
(Continued)

(58) Field of Classification Search
CPC ...... G06F 1/08; G06F 11/1633; G06F 16/903; G06F 1/12; G06F 9/3836; G06F 9/3877;
(Continued)

(56) References Cited

U.S. PATENT DOCUMENTS

| 5,239,641 A | 8/1993 | Horst |
| 5,353,436 A | 10/1994 | Horst |

(Continued)

FOREIGN PATENT DOCUMENTS

| DE | 102005054587 A1 | 5/2007 |
| EP | 0316087 A2 | 5/1989 |
| EP | 3048499 A1 | 7/2016 |

OTHER PUBLICATIONS

Prew; "Why the Architecture of Safety Systems doesn't matter" 3BNP100416, Dec. 3, 2008.

(Continued)

*Primary Examiner* — Xuxing Chen
(74) *Attorney, Agent, or Firm* — Muncy, Geissler, Olds & Lowe, P.C.

(57) ABSTRACT

A circuit is provided that has three clock sources, a first processing unit connected to the first clock source, a second processing unit connected to the second clock source, and an input unit. The first processing unit has a first logic circuit and a first memory circuit connected to the first logic circuit, wherein a first set of instructions, which is designed to implement a first control program when executed by the first logic circuit, is stored in the first memory circuit, wherein the first clock source specifies a clock timing of the execution of the first set of instructions. The second processing unit has a second logic circuit and a second memory circuit connected to the second logic circuit, wherein a second set of instructions, which is designed to implement a second control program when executed by the second logic circuit, is stored in the second memory circuit.

10 Claims, 2 Drawing Sheets

(51) Int. Cl.
| | |
|---|---|
| *H04L 5/00* | (2006.01) |
| *H04L 7/00* | (2006.01) |
| *G06F 1/08* | (2006.01) |
| *G06F 16/903* | (2019.01) |
| *G06F 9/38* | (2018.01) |
| *G05B 19/042* | (2006.01) |
| *G05B 19/05* | (2006.01) |
| *G06F 11/16* | (2006.01) |
| *G05B 23/02* | (2006.01) |

(52) U.S. Cl.
CPC .......... *G06F 9/3836* (2013.01); *G06F 9/3877* (2013.01); *G06F 11/1633* (2013.01); *G06F 16/903* (2019.01); *G05B 23/0237* (2013.01); *G05B 2219/14012* (2013.01); *G05B 2219/14014* (2013.01); *G05B 2219/24008* (2013.01); *G05B 2219/24184* (2013.01); *G05B 2219/24187* (2013.01)

(58) Field of Classification Search
CPC .............. G05B 19/0428; G05B 19/058; G05B 2219/24187; G05B 2219/24184; G05B 2219/24008; G05B 2219/14014; G05B 2219/14012; G05B 23/0237
See application file for complete search history.

(56) References Cited

U.S. PATENT DOCUMENTS

| | | | |
|---|---|---|---|
| 5,384,906 A | 1/1995 | Horst | |
| 6,275,752 B1* | 8/2001 | Giers | .................... F02D 41/266 701/33.7 |
| 7,043,728 B1* | 5/2006 | Galpin | ............... G05B 19/0428 718/100 |
| 9,052,887 B2* | 6/2015 | Rohleder | .................. G06F 9/28 |
| 9,632,492 B2 | 4/2017 | Koh | |
| 9,964,937 B2 | 5/2018 | Koh | |
| 2003/0093570 A1* | 5/2003 | Bissett | ................ G06F 11/1633 709/248 |
| 2010/0017579 A1 | 1/2010 | Mueller et al. | |

OTHER PUBLICATIONS

International Search Report dated Dec. 21, 2017 in corresponding application PCT/IB2017/001267.

* cited by examiner

CONTROL OF REDUNDANT PROCESSING UNITS

This nonprovisional application is a continuation of International Application No. PCT/IB2017/001267, which was filed on Oct. 19, 2017, and which claims priority to German Patent Application No. 20 2016 007 417.3, which was filed in Germany on Dec. 3, 2016, and which are both herein incorporated by reference.

BACKGROUND OF THE INVENTION

Field of the Invention

The present invention relates to redundant processing units. In particular, the present invention relates to parallel-redundant processing units that can be activated and deactivated by a mode selector switch.

Description of the Background Art

Parallel-redundant processing units (for example, parallel-redundant microcontrollers) are often used for control in safety-related automation systems (also referred to below as "safety controllers"). The parallel-redundant microcontrollers, for example, execute a runtime system parallel in time, which interprets an IEC application and processes process data. The processing cycles, formed of the reading in of the input information, its processing, and the results output, are typically triggered by a common signal and started cyclically synchronously. The synchronization signal can be provided externally or generated by one of the safety controllers themselves. At the end, before the outputting of the results, a cross comparison is usually performed between the safety controllers to detect processing errors.

The operation of the parallel-redundant microcontrollers is usually controlled by a mode selector switch by which the execution of the IEC program can be started and stopped (RUN/STOP). To this end, the state of the mode selector switch is read in, for example, before a processing cycle and decides whether the two safety controllers execute the IEC application. It is important that the decision as to whether or not the interpreter should be executed in one cycle is always decided identically by both safety controllers. Only then can the results to be checked in the final cross comparison be identical. The logical switch state of the mode selector switch must therefore be able to be read by both safety controllers and always lead to the same result on both safety controllers.

SUMMARY OF THE INVENTION

It is therefore an object of the present invention to improve the concepts known from the prior art for operating parallel-redundant processing units.

In an exemplary embodiment, a circuit is provided that comprises a first clock source, a second clock source, and a third clock source, a first processing unit, connected to the first clock source and having a first logic circuit and a first memory circuit connected to the first logic circuit, wherein a first set of instructions, which is designed to implement a first control program when executed by the first logic circuit, is stored in the first memory circuit, wherein the first clock source specifies a clock timing of the execution of the first set of instructions, a second processing unit, connected to the second clock source and having a second logic circuit and a second memory circuit connected to the second logic circuit, wherein a second set of instructions, which is designed to implement a second control program when executed by the second logic circuit, is stored in the second memory circuit, wherein the second clock source specifies a clock timing of the execution of the second set of instructions and the second set of instructions is a functionally identical copy of the first set of instructions, and an input unit, wherein the first processing unit is designed, in response to a signal of the third clock source, to query an input state of the input unit and to output the queried input state at an output of the first processing unit, wherein a second input of the second processing unit is connected to the output of the first processing unit, and the first processing unit and the second processing unit are designed to determine the outputted input state after a predefined nominal duration after the signal of the third clock source and, if execution of the instructions is associated with the determined input state, to execute the instructions, and wherein the circuit is also designed to compare a first control signal, produced by the first processing unit by the execution of the first set of instructions, with a second control signal, produced by the second processing unit by the execution of the second set of instructions, and, in the case of deviations between the first control signal and the second control signal, to generate an error signal.

In this case, the term "clock source," can be understood in particular as a component that generates a (binary) frequency-stable clock signal. Further, the term "processing unit," can be understood to be, for example, a unit that converts input signals into output signals in accordance with one or more instructions. Moreover, the term "logic circuit," can be understood in particular as a circuit, i.e., a concatenation of electronic components, which comprises signal level-comparing components.

In addition, the term "memory circuit," can be understood in particular as a circuit comprising components that can be actively brought into different states, wherein the states remain stable for a defined duration or substantially indefinitely. Further, the term "control program," can be understood in particular as a sequence of instructions that, building upon one another, convert input signals into output signals. Moreover, the term "error signal," can be understood as a signal that can be or is interpreted as a signal for indicating an error.

A first input of the first processing unit can be connected to the output of the first processing unit.

The determination of the outputted input state by the first processing unit can be clocked by the first clock source and the determination of the outputted input state by the second processing unit is clocked by the second clock source. The term "clocked" in this context means in particular that process steps carried out in connection with the determination are executed in an (operating) cycle specified by the respective clock source.

The first clock source and the second clock source can have an identical nominal frequency, and the nominal duration is selected with consideration of a maximum frequency deviation of the first clock source from the nominal frequency and with consideration of a maximum frequency deviation of the second clock source from the nominal frequency such that a minimum real duration between the outputting of the input state by the first processing unit and the determination of the input state by the processing units is greater than zero.

The term "nominal duration," can be understood in particular as a duration determined by a number of cycles of a clock source multiplied by a target clock time of the clock source. The term "real duration," can be understood in particular as an actual duration which elapses during the number of cycles. The nominal duration and real duration thus coincide if the clock source exactly complies with the target clock time. On the other hand, the more an actual frequency deviates from the nominal frequency of the clock source, the greater the difference between the nominal and real duration. The nominal and real duration thus reflect a deviation of a real execution time from a desired or expected execution time, said deviation resulting from a deviation of the actual frequency from the nominal frequency.

Preferably, the second processing unit is designed, in response to a signal of the third clock source, to query an input state and to output the queried input state at an output of the second processing unit.

Preferably, the first logic circuit of the first processing unit and the second logic circuit of the second processing unit are made functionally identical. "Functionally identical" is to apply in particular to circuits that generate identical output signals with identical input circuitry.

Preferably, the first processing unit is integrated into a first housing and the second processing unit is integrated into a second housing and the circuit has a third housing, wherein the first housing and the second housing are integrated into the third housing. The term "housing" can be understood in particular as an insulating material element that encloses essential or all elements of the particular processing unit or processing units.

Preferably, the first clock source is integrated into the first housing, the second clock source into the second housing, and the third clock source into the third housing.

Preferably, the first processing unit is designed to determine the input state of the input unit in response to the signal of the third clock source by executing the first set of instructions.

Preferably, the circuit is designed to execute the first control program and the second control program in correlated manner in each period of the third clock source. The term "correlated" can be understood in this case in particular as a temporal correlation, according to which the first control program and the second control program are not executed absolutely synchronously but, for example, with a delay to one another which is within predetermined limits.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
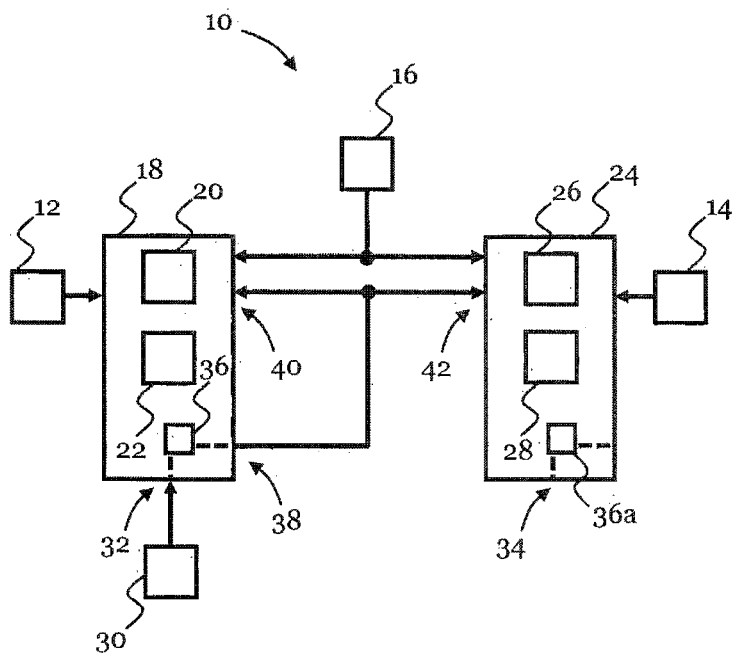
FIG. 1 is a schematic representation of a circuit of the invention according to an exemplary embodiment.

FIG. 1 shows a schematic representation of a circuit 10 of the invention according to an exemplary embodiment. Circuit 10 comprises a first clock source 12, a second clock source 14, and a third clock source 16, each providing a clock signal, wherein first clock source 12 and second clock source 14 can have the same and in particular a higher clock frequency than third clock source 16. First clock source 12 is connected to a first processing unit 18 or supplies first processing unit 18 with a clock signal.

First processing unit 18 has a first logic circuit 20 and a first memory circuit 22 connected to first logic circuit 20. First memory circuit 22 stores a first set of instructions.

The first set of instructions is directed to a first control program which is performed cyclically by executing the instructions (by first logic circuit 20). The first control program reads input data or input signals, for example, within one cycle and determines the output data or output signals based on the input data or based on the input signals. The speed of the execution of the instructions and thus the duration of a processing cycle is determined by the frequency of the clock signal of first clock source 12, which specifies the operating cycle of first logic circuit 20.

Second clock source 14 is connected to a second processing unit 24 and supplies second processing unit 24 with a clock signal. Second processing unit 24 has a second logic circuit 26 and a second memory circuit 28 which is connected to second logic circuit 26 and stores a second set of instructions. The second set of instructions is directed to a second control program which is (functionally) identical to the first control program and which is performed cyclically by executing the instructions (by second logic circuit 26). The second control program reads in the input data or input signals, for example, within one cycle, and determines the output data or output signals based on the input data or based on the input signals.

The speed with which the second set of instructions is executed by second logic circuit 26 is determined in this case by the frequency of the clock signal of second clock source 14, which specifies the operating cycle of second logic circuit 26. The speed with which the respective set of instructions is executed by first logic circuit 20 and second logic circuit 26 can thus deviate from one another, depending on the frequency of the clock signal of first clock source 12 and second clock source 14. Because the first set of instructions and the second set of instructions comprise (functionally) identical instructions, in the case of error-free operation the same output data or output signals are generated based on the same input data or the same input signals by first processing unit 18 and second processing unit 24.

To check the error-free operation, the output data or output signals of first processing unit 18 and second processing unit 24 can be subjected to a cross comparison. The cross comparison can be carried out, for example, in that first processing unit 18 and second processing unit 24 are connected by means of one or more data lines (not shown), and first processing unit 18 and second processing unit 24 can read in the output data or output signals of the respective other processing unit by means of the one or more data lines. If a (significant) deviation is detected in the cross comparison, an error signal can be generated which, for example, can be transmitted to a monitoring unit. The monitoring unit can in response to the error signal, for example, reset first processing unit 18 and second processing unit 24 and/or stop a process controlled by first processing unit 18 and second processing unit 24. After a successful cross comparison, i.e., in the case of error-free operation, the output data or the output signals can be provided by first processing unit 18 and/or second processing unit 24 and be used for process control.

Circuit 10 further comprises an input unit 30 in the form of a mode selector switch, which can be used for inputting or selecting whether or not first processing unit 18 is to execute the first set of instructions and second processing unit 24 is to execute the second set of instructions in a cycle specified by third clock source 16. In other words, input unit 30 enables an activation and stopping of the cyclic processing of input data by first processing unit 18 and by second processing unit 24. Whereas the clock signal of first clock source 12 is available only to first processing unit 18 and the clock signal of second clock source 14 only to second processing unit 24, the clock signal of the third clock source thus enables synchronization of processing cycles executed by first processing unit 18 and second processing unit 24.

In this regard, first processing unit 18 is designed in response to a (clock) signal of third clock source 16 to read in a signal of input unit 30, said signal being applied at a first input 32 of first processing unit 18. If second processing unit 24, as shown in FIG. 1, is made functionally identical to first processing unit 18, second processing unit 24 is also designed to read in a signal present at a first input 34 of second processing unit 24 in response to a signal of third clock source 16. However, whereas first input 34 of second processing unit 24 is not connected and thus no specific signal is present, first input 32 of first processing unit 18 is connected to input unit 30.

As shown in FIG. 1, the signal provided by input unit 30 is thus sampled by a sampling and holding circuit 36 of first processing unit 18 and outputted at an output 38 of first processing unit 18. Connected to output 38 of first processing unit 18 is an electrical conductor which transmits the outputted signal to a second input 40 of first processing unit 18 and to a second input 42 of second processing unit 24. First processing unit 18 and second processing unit 24 are further designed to determine the outputted input state after a predefined nominal duration after the signal of third clock source 16 and, if execution of the instructions is associated with the particular input state, to execute the instructions.

Figure 2:
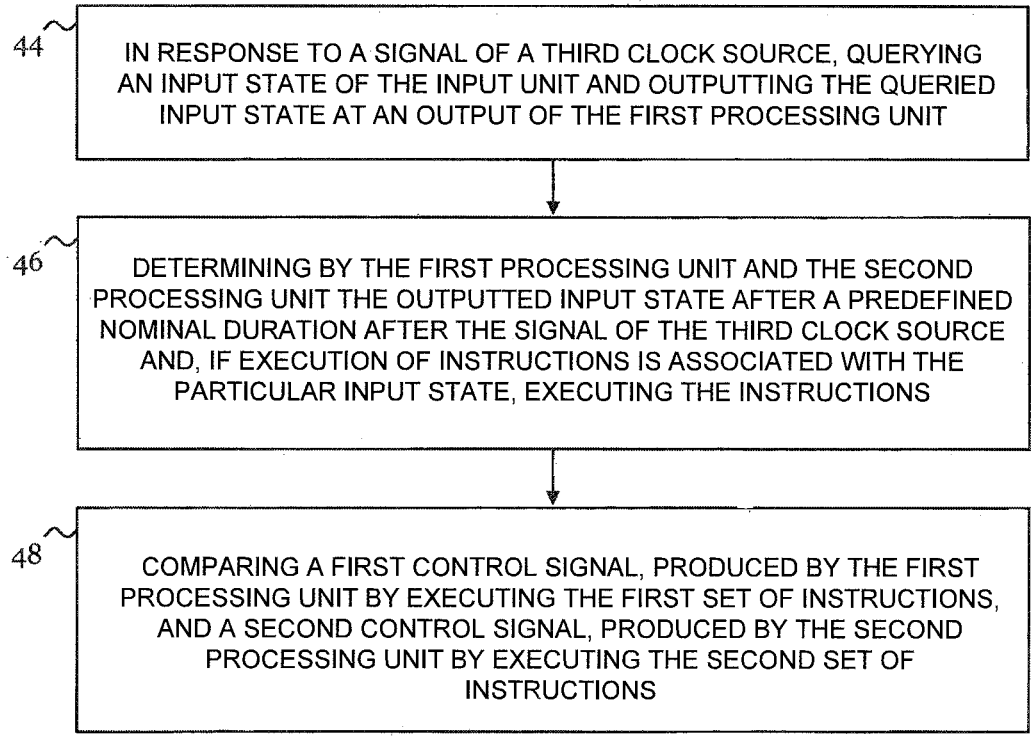
FIG. 2 is a flowchart of a process implemented by the circuit.

The process implemented by circuit 10 thus comprises, as shown in steps 44 through 48 in FIG. 2, querying the input state of input unit 30 and outputting the queried input state at output 38 of first processing unit 18, reading in the outputted input state after a predefined nominal signal duration by first processing unit 18 and second processing unit 24, executing the instructions if the read input state so dictates, and comparing the control signals generated according to the instructions by processing unit 18 and second processing unit 24.

Figure 3:
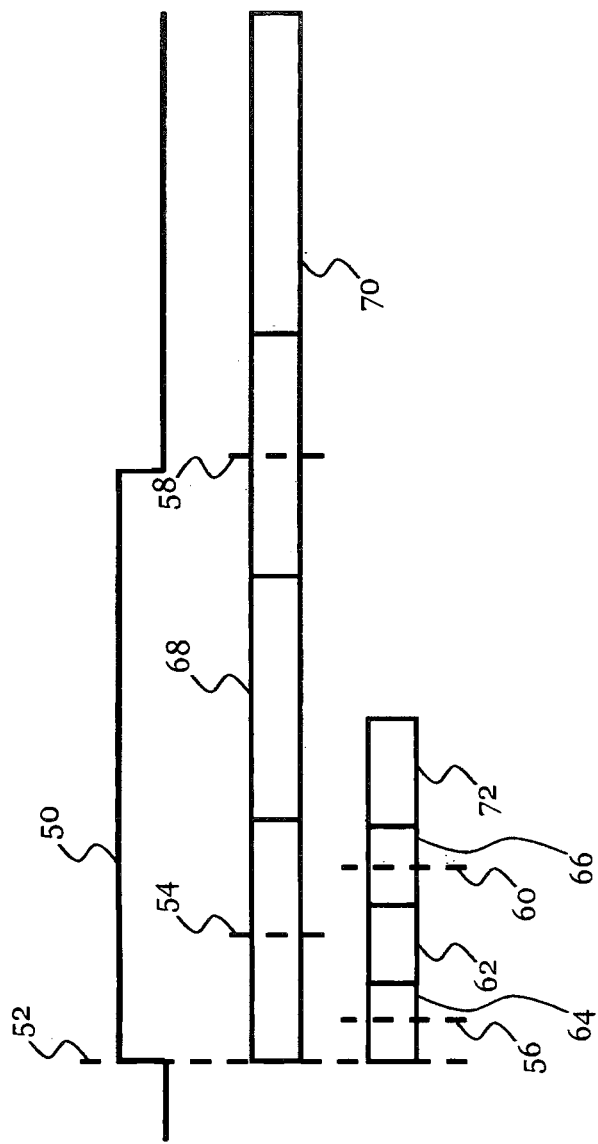
FIG. 3 shows an exemplary time sequence of a process implemented by the circuit.

FIG. 3 illustrates the determination of the nominal duration (after the signal of third clock source 16), after which the outputted input state is determined by first processing unit 18 and second processing unit 24. The illustration shown in FIG. 3 shows clock signal 50 provided by third clock source 16. In response to clock signal 50 or an edge of clock signal 50 at a first point in time 52, first processing unit 18 and second processing unit 24 start with a routine for querying, outputting, and determining the input state. Although second processing unit 24 is not connected, as shown in FIG. 1, FIG. 3 shows the querying of the input state by first processing unit 18 at a second point in time 54 and the querying of an input state by second processing unit 24 at a third point in time 56. After the querying, the input state is outputted starting at the second point in time 54 or the third point in time 56 by means of the sampling and holding circuits 36 and 36a shown in FIG. 1.

The outputted input state is determined at the fourth point in time 58 and at the fifth point in time 60 by first processing unit 18 or by second processing unit 24, respectively. Although the real processing speed of second processing unit 24 may be greater than that of first processing unit 18, as is evident from FIG. 3, a second time interval 62 between a first time interval 64, in which the outputting by second processing unit 24 takes place, and a third time interval 66, in which the determination by second processing unit 24 takes place, prevents that the fifth point in time 60 lies before the second point in time 54. Because the querying, outputting, and determination of the input state by first processing unit 18 and by second processing unit 24 are run nominally synchronously, as shown in FIG. 3, a fourth time interval 68 is also inserted between the outputting and the determination by first processing unit 18, which, however, could in principle also be omitted in the case shown in FIG. 1.

The nominal length of second time interval 62 is based in this case on a speed factor which indicates the relationship between the nominal frequencies and the minimum and maximum expected frequencies of the two clock sources 12 and 14. The nominal length of second time interval 62 is selected so that at a minimum expected actual frequency of first clock source 12 and a maximum expected actual frequency of second clock source 14, a real time interval between the outputting by first processing unit 18 and the determination by second processing unit 24 is greater than zero. Assuming, for example, that the actual frequency of first clock source 12 and the actual frequency of second clock source 14 in one interval [$f_{min}$; $f_{max}$] are around the common nominal frequency $f_{nom}$, the nominal duration $I_{nom}$ between the first point in time 52 and the determination at the fifth point in time 60, taking into account a nominal time interval $K_{nom}$ between the first point in time 52 and the outputting at the second point in time 54, must be greater than:

$$K_{nom} \frac{f_{max}}{f_{min}}$$

to ensure that first processing unit 18 or second processing unit 24 determines the current input state only after it has been outputted by a corresponding processing unit. Otherwise, it could happen that first processing unit 18 and second processing unit 24 determine different input states.

After the determination of the input state, first processing unit 18 and second processing unit 24 can execute the instructions in the time intervals 70 and 72, respectively, subsequent to the determination, if the read-in input state specifies this. The cycle of third clock source 16 can be chosen so that an oscillation of the clock signal takes longer than the querying, outputting, and determining of the input state, the execution of the instructions, and the comparison and providing or outputting of the output data or the output signals.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A circuit comprising:
   a first clock source;
   a second clock source;
   a third clock source;
   a first processing unit connected to the first clock source and having a first logic circuit and a first memory circuit connected to the first logic circuit, wherein a first set of instructions, which is designed to implement a first control program when executed by the first logic circuit, is stored in the first memory circuit, wherein the first clock source specifies a clock timing of the execution of the first set of instructions;
   a second processing unit connected to the second clock source and having a second logic circuit and a second memory circuit connected to the second logic circuit, wherein a second set of instructions, which is designed to implement a second control program when executed by the second logic circuit, is stored in the second memory circuit, wherein the second clock source specifies a clock timing of the execution of the second set of instructions and the second set of instructions is a functionally identical copy of the first set of instructions;
   an input unit, wherein the first processing unit is designed, in response to a signal of the third clock source, to query an input state of the input unit and to output the queried input state at an output of the first processing unit; and
   a second input of the second processing unit is connected to the output of the first processing unit, and the first processing unit and the second processing unit determine the outputted input state after a predefined nominal time duration $I_{nom}$, after the signal of the third clock source and, if execution of the instructions is associated with the particular input state, to execute the instructions,
   wherein the circuit compares a first control signal, produced by the first processing unit by the execution of the first set of instructions, with a second control signal, produced by the second processing unit by the execution of the second set of instructions, and, in the case of deviations between the first control signal and the second control signal, to generate an error signal.

2. The circuit according to claim 1, wherein a first input of the first processing unit is connected to the output of the first processing unit.

3. The circuit according to claim 1, wherein the determination of the outputted input state by the first processing unit is clocked by the first clock source and the determination of the outputted input state by the second processing unit is clocked by the second clock source.

4. The circuit according to claim 3, wherein the first clock source and the second clock source have an identical nominal frequency, $f_{nom}$, and the nominal duration, $I_{nom}$, is selected with consideration of a maximum frequency deviation of the first clock source from the nominal frequency and with consideration of a maximum frequency deviation of the second clock source from the nominal frequency such that a minimum real duration between the outputting of the input state by the first processing unit and the determination of the input state by the processing units is greater than zero.

5. The circuit according to claim 1, wherein the second processing unit is designed, in response to a signal of the third clock source, to query an input state and to output the queried input state at an output of the second processing unit.

6. The circuit according to claim 1, wherein the first logic circuit of the first processing unit and the second logic circuit of the second processing unit are made functionally identical.

7. The circuit according to claim 1, wherein the first processing unit is integrated into a first housing and the second processing unit is integrated into a second housing and the circuit has a third housing, wherein the first housing and the second housing are integrated into the third housing.

8. The circuit according to claim 7, wherein the first clock source is integrated into the first housing, the second clock source into the second housing, and the third clock source into the third housing.

9. The circuit according to claim 1, wherein the first processing unit is designed to determine the input state of the input unit in response to the signal of the third clock source by executing the first set of instructions.

10. The circuit according to claim 1, wherein the circuit is designed to execute the first control program and the second control program in correlated manner in each period of the third clock source.

* * * * *